US008144130B2

(12) United States Patent
Segev et al.

(10) Patent No.: US 8,144,130 B2
(45) Date of Patent: Mar. 27, 2012

(54) SECURED TOUCH SCREEN (75) Inventors: Erez Segev, Nofit (IL); Henk Schaer, Susteren (NL); Mony S. Zenou, Great Neck, NY (US)

(73) Assignee: i-POS Systems, LLC, Manhasset, NY (US)

( * ) Notice: Subject to any disclaimer, the term of this patent is extended or adjusted under 35 U.S.C. 154(b) by 884 days.

(21) Appl. No.: 11/984,677

(22) Filed: Nov. 20, 2007

(65) Prior Publication Data

US 2009/0128512 A1 May 21, 2009

(51) Int. Cl.
*G06F 3/045* (2006.01)
(52) U.S. Cl. ...................................... 345/174; 178/18.05
(58) Field of Classification Search .......... 345/173–178; 178/18.03, 18.05
See application file for complete search history.

(56) References Cited

U.S. PATENT DOCUMENTS

| | | | | |
|---|---|---|---|---|
| 4,245,346 A * | 1/1981 | Grady et al. | ..................... | 380/31 |
| 5,496,974 A * | 3/1996 | Akebi et al. | ................ | 178/18.05 |
| 5,852,260 A * | 12/1998 | Yoshikawa | ................. | 178/18.01 |
| 6,411,284 B1 * | 6/2002 | Junghans | ....................... | 345/173 |
| 6,646,634 B2 | 11/2003 | Berelovich | | |
| 6,954,868 B2 | 10/2005 | Lin | | |
| 7,236,160 B2 * | 6/2007 | Kong | ............................ | 345/173 |
| 7,492,896 B2 * | 2/2009 | Quan | ............................ | 380/221 |
| 2002/0044137 A1 * | 4/2002 | Kim | ............................... | 345/173 |
| 2003/0122796 A1 * | 7/2003 | Kong | ............................ | 345/173 |
| 2005/0275634 A1 | 12/2005 | Chi | | |
| 2007/0030715 A1 * | 2/2007 | Manolescu | ..................... | 363/84 |

OTHER PUBLICATIONS

Andy Miller and Michael Gulotto, Application Note "PN Generators Using the SRL Macro," Jun. 14, 2004, Xilinx Corporation, pp. 1, 4-5, 8.*

* cited by examiner

*Primary Examiner* — Alexander Eisen
*Assistant Examiner* — Sanjiv D Patel
(74) *Attorney, Agent, or Firm* — Nathan & Associates Patent Agents Ltd.; Menachem Nathan (57) ABSTRACT

A secure touch screen device comprises a resistive touch screen having a plurality of touch positions, having a first pair of first and second terminals at opposite ends of a first axis of the touch screen, and a second pair of first and second terminals at opposite ends of a second axis of the touch screen, the second axis being orthogonal to the first axis. Upon pressing on a certain position on the touch screen there exist an electrical resistance between the first pair of terminals and an electrical resistance between the second pair of terminals, indicative of the position pressed. The first terminal of each pair of terminals is grounded, and the second terminal of each pair of terminals is connected to a variable resistance component connectable to a voltage source. The resistance of the variable resistance component is variable in a predetermined manner, the second terminal of each pairs of terminals being used to measure the resistance indicative of the position pressed.

20 Claims, 5 Drawing Sheets

PRIOR ART

PRIOR ART

FIG. 5

SECURED TOUCH SCREEN

FIELD OF THE INVENTION

The invention relates generally to improvements in touch screens, also referred to as touch panel displays. More specifically, the invention relates to methods for providing eavesdropping-resistant secured touch screen and apparatus therein.

BACKGROUND OF THE INVENTION

Transparent touch screens produce electrical signals which correspond to a position on the touch screen being touched (activated) and are widely used as user input devices for electronic transaction terminal devices such as automated teller machines (ATMs) and point of sale (POS) terminals.

Figure 1A:
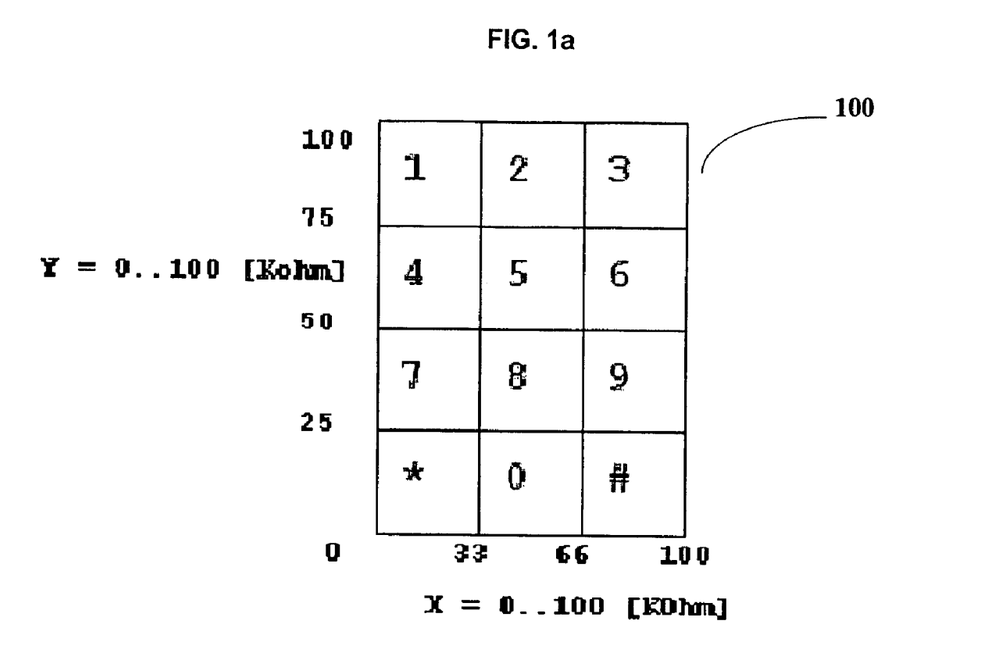
FIG. 1a shows an exemplary display of a touch screen according to the prior art.
Figure 1B:
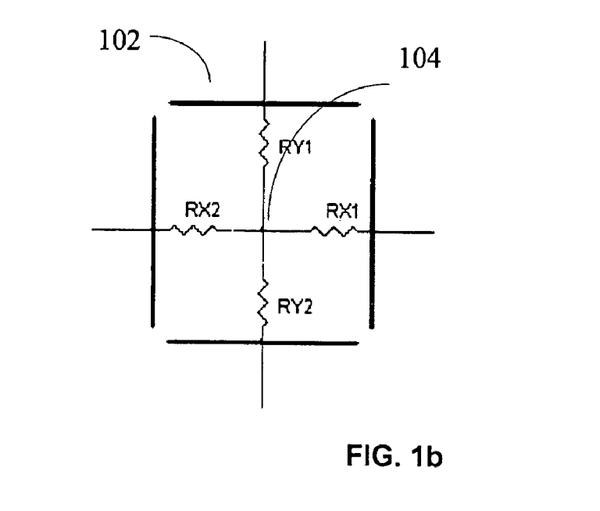
FIG. 1b illustrate a schematic resistance equivalence circuitry of a touch screen according to the prior art.

A resistive touch screen is probably the most widely used and cost effective touch screen on the market today. A resistive touch screen comprises a scratch-resistant layer that protects two conductive layers held apart by spacers. The scratch-resistant layer and the conductive layers are transparent to allow viewing of an underlying display such as display 100 in FIG. 1*a*. In a simplified model of a resistive touch screen, each conductive layer is modeled as a resistive component 102. The resistive component may be considered as having Y axis and X-axis resistances, shown for display 100 varying linearly from 0 to 100K ohms. An electrical current is conducted by the resistive touch screen when a voltage is applied across a conductive metallic layer. In general, one conductive layer of the resistive touch screen is operated such that current flows in the X-direction while the other conductive layer is operated such that current flows in the Y-direction. When an object touches the screen ("presses a pad"), for example at a position 104 (see FIG. 1*b*), the two conductive layers make contact. This creates a bridge resistance between the X and Y axis, dividing the X and Y axis resistances into RX1, RX2 and RY1, RY2 respectively.

Figure 2A:
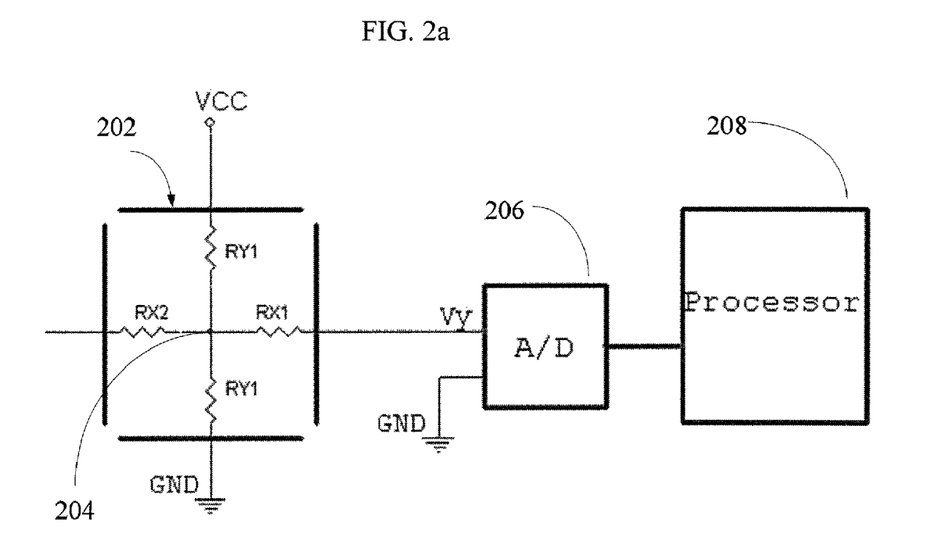
FIG. 2a shows a known method of determining the Y axis resistance indicative of the Y component press position on the touch screen.
Figure 2B:
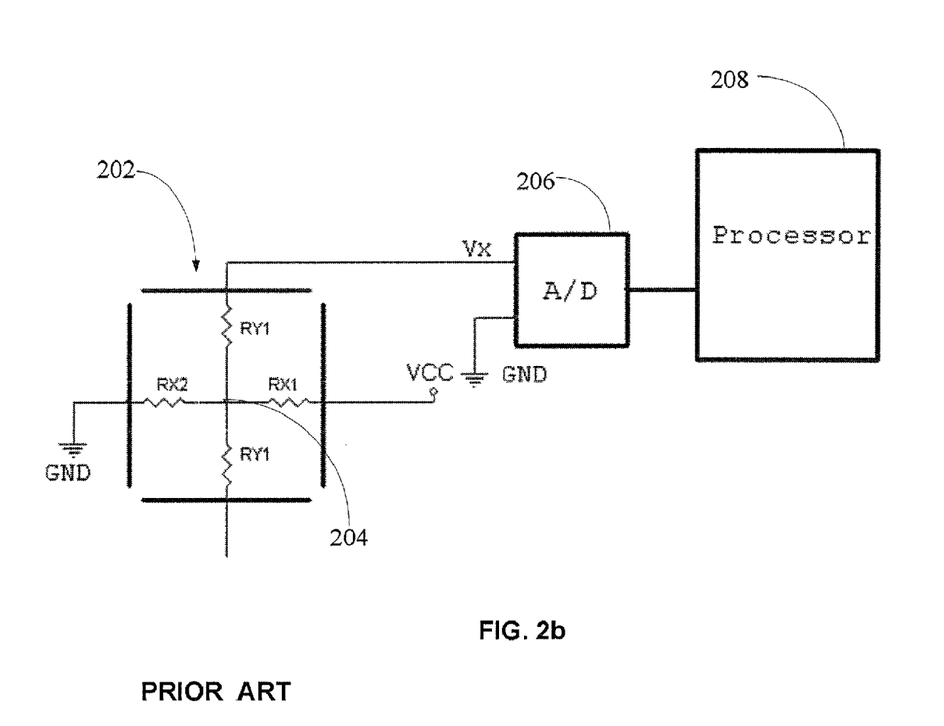
FIG. 2b shows a known method of determining the X axis resistance indicative of the X component press position on the touch screen.

An approach for determining the point of contact on the resistive touch screen, shown in FIG. 2*a* and FIG. 2*b*, is to separately sense a voltage at the point of contact in the x-direction (FIG. 2*b*) and the y-direction (FIG. 2*a*)—respectively Vx and Vy. Since each conductive layer is a resistor divider, sensing the voltage at the point of contact allows the position to be calculated. Knowing the position on the resistive touch screen in both the X and Y directions identifies the location of contact. In FIG. 2*a* the Vy measurement is done as shown, and the Vx measurement is done as shown in FIG. 2*b*. The touch screen is connected between a voltage Vcc and ground, with the voltages ("touch signals") Vx, Vy sampled through an analog to digital (A/D) converter 206 by a processor (controller) 208 when a touch point (pad) 204 is pressed.

The use of touch screens in ATMs, POS devices, and other such devices, normally involves the entry of a personal identification number (PIN) as a form of identification. Any access to this PIN by an unauthorized party could be extremely damaging to the legitimate user's account. Such access may be achieved for example by eavesdropping on the electrical signals from a touch screen during PIN entry. These signals can then be used by the unauthorized party during a subsequent transaction to falsely identify itself as the PIN assignee. Eavesdropping may be done by monitoring the wires coupling the resistive touch screen to a main printed circuit board (system circuitry). The change in voltage on these wires could be detected easily, for example by parallel connection of a voltmeter to the wires or by inductively sensing the change in voltage. Known solutions to such eavesdropping include for example the solution suggested in U.S. Pat. No. 6,411,284. A reference signal input to the touch screen is varied randomly (in a way known only to the processor) such that voltages Vx, Vy change randomly for the same touch point along a time axis (from one touch "event" to the next). The reference signal may be based on voltage (Vcc), current or phase. Because the reference signal is analog, a digital to analog (D/A) converter is needed to provide digital inputs. By varying the reference signal, information entered on the touch screen is difficult to reproduce in a meaningful way by a third party eavesdropping on the x-axis signal and the y-axis signal.

Disadvantages of known solutions include requirements for D/A converters, which increase cost, as well as noise that is inherent in schemes based on varying reference signals. Another problem stems from the fact that it is rather intricate to calibrate the touch screen properly. It would therefore be advantageous to have inexpensive and simple to implement methods and systems which enhance the security of touch screens and which do not suffer from the disadvantages mentioned.

A more complete understanding of the present invention, as well as further features and advantages of the present invention, will become apparent after reading the following detailed description and reviewing the accompanying drawings.

SUMMARY OF THE INVENTION

There is thus provided, in accordance with some preferred embodiments of the present invention a secure touch screen device comprising: a resistive touch screen having a plurality of touch positions, having a first pair of first and second terminals at opposite ends of a first axis of the touch screen, and a second pair of first and second terminals at opposite ends of a second axis of the touch screen, the second axis being orthogonal to the first axis, wherein upon pressing on a certain position on the touch screen there exist an electrical resistance between the first pair of terminals and an electrical resistance between the second pair of terminals, indicative of the position pressed, wherein the first terminal of each pair of terminals is grounded and wherein the second terminal of each pair of terminals is connected to a variable resistance component connectable to a voltage source, the resistance of the variable resistance component being variable in a predetermined manner, the second terminal of each pairs of terminals being used to measure the resistance indicative of the position pressed.

Furthermore, in accordance with some preferred embodiments of the present invention, the device further comprises a controller for controlling the variable resistance component and changing the resistance in the predetermined manner.

Furthermore, in accordance with some preferred embodiments of the present invention, the processor includes three-state outputs for connecting to the variable resistance component.

Furthermore, in accordance with some preferred embodiments of the present invention, the variable resistance component connected to the second terminal of the first pair of terminals, and the variable resistance component connected to the second terminal of the second pair of terminals comprise a single variable resistance component.

Furthermore, in accordance with some preferred embodiments of the present invention, the variable resistance component connected to the second terminal of the first pair of terminals, and the variable resistance component connected to the second terminal of the second pair of terminals comprise two variable resistance components.

Furthermore, in accordance with some preferred embodiments of the present invention, the device is further provided with switching so as to disconnect one of the second terminals of the pairs of terminals when the other is used for measurement.

Furthermore, in accordance with some preferred embodiments of the present invention, the variable resistance component comprises a plurality of resistors of different resistance values, which are separately connectable or connectable in combinations.

Furthermore, in accordance with some preferred embodiments of the present invention, the device is provided with switches for each resistor of the plurality of resistors.

Furthermore, in accordance with some preferred embodiments of the present invention, there is provided a method for providing secured input of information tapped on a touch screen, the method comprising: providing touch screen device comprising a resistive touch screen having a plurality of touch positions, having a first pair of first and second terminals at opposite ends of a first axis of the touch screen, and a second pair of first and second terminals at opposite ends of a second axis of the touch screen, the second axis being orthogonal to the first axis, wherein upon pressing on a certain position on the touch screen there exist an electrical resistance between the first pair of terminals and an electrical resistance between the second pair of terminals, indicative of the position pressed; grounding the first terminal of each pair of terminals; connecting the second terminal of each pair of terminals to a variable resistance component connected to a voltage source, varying the resistance of the variable resistance component in a predetermined manner; measuring at the second terminal of each pairs of terminals the resistance indicative of the position pressed.

Furthermore, in accordance with some preferred embodiments of the present invention, the step of varying the resistance of the variable resistance component in a predetermined manner includes one or more of a group of actions that includes: generating a random generation sequence, using a predetermined algorithm, using a look-up table.

Furthermore, in accordance with some preferred embodiments of the present invention, the method further comprises providing a controller for controlling the step of varying the resistance of the variable resistance component.

Furthermore, in accordance with some preferred embodiments of the present invention, the step of connecting the second terminal of each pair of terminals to a variable resistance component connected to a voltage source comprises connecting the second terminal of the first pair of terminals, and the second terminal of the second pair of terminals to separate variable resistance components.

Furthermore, in accordance with some preferred embodiments of the present invention, the step of connecting the second terminal of each pair of terminals to a variable resistance component connected to a voltage source comprises connecting the second terminal of the first pair of terminals, and the second terminal of the second pair of terminals to same variable resistance component.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention. Like components are denoted by like reference numerals

DETAILED DESCRIPTION OF THE INVENTION

One aspect of the present invention is the provision of an eavesdropping-resistant resistive touch screen.

By "resistive touch screen" is meant a touch screen comprising an array of resistors and 2 by 2 end terminals (a pair of terminals corresponding to X axis and a pair of terminals corresponding to Y axis) which, when pressing on a certain position on the screen result in a unique combination of vertical and horizontal resistance measurements indicative of the poison of applied pressure.

An aim of the present invention is to prevent unauthorized tracking in real-time of inputting of identification information on a resistive touch screen.

This is implemented in any of the three ways described herein, or combination thereof.

In all these three ways two terminals—one terminal of each pair of axis terminals (X and Y) is constantly connected to ground. The corresponding two other terminals are each connected through a variable resistor to a voltage source of constant voltage.

Each time a position on the touch screen is pressed two consecutive measurements are done: in the first measurement one of the axis terminals is effectively disconnected from the voltage source, which a voltage measurement is taken across the variable resistor of the other axis terminal. As the voltage drop at the measured point is also affected by the resistance created by the pressed touch screen, this reading is indicative of the position pressed. This is in fact a relative measurement as opposed to absolute measurement as used in prior art devices and methods. After each pressing on the touch screen the variable resistors of both X and Y axes are changed in a known manner so that the interpreter (the controller) can distinctly determine which position on the touch screen was pressed. On the other hand unauthorized measurements across the touch screen would yield intangible results as the manner in which the resistance of the variable resistors is changed cannot be determined.

Figure 3:
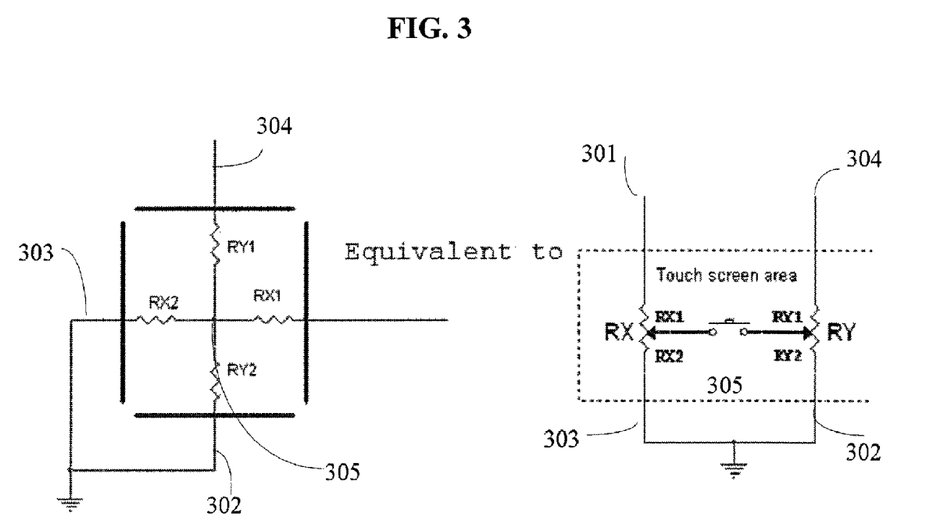
FIG. 3 is provided to demonstrate the resistance equivalence circuitry of a secured touch screen in accordance with a preferred embodiment of the present invention, in the drawing on the left-hand side and the drawing shown on the right-hand side.

FIG. 3 is provided to demonstrate the equivalence of drawing end terminals of the touch screen in the manner shown on the left-hand side and the manner shown on the right-hand side the position at which the touch screen is pressed is indicated by numeral 304. The X axis pair of terminals comprises terminal 301 and terminal 303, whereas the Y axis pair of terminals comprises terminal 302 and terminal 304. The free terminals are: terminal 301 (X) and terminal 304 (Y).

Figure 4:
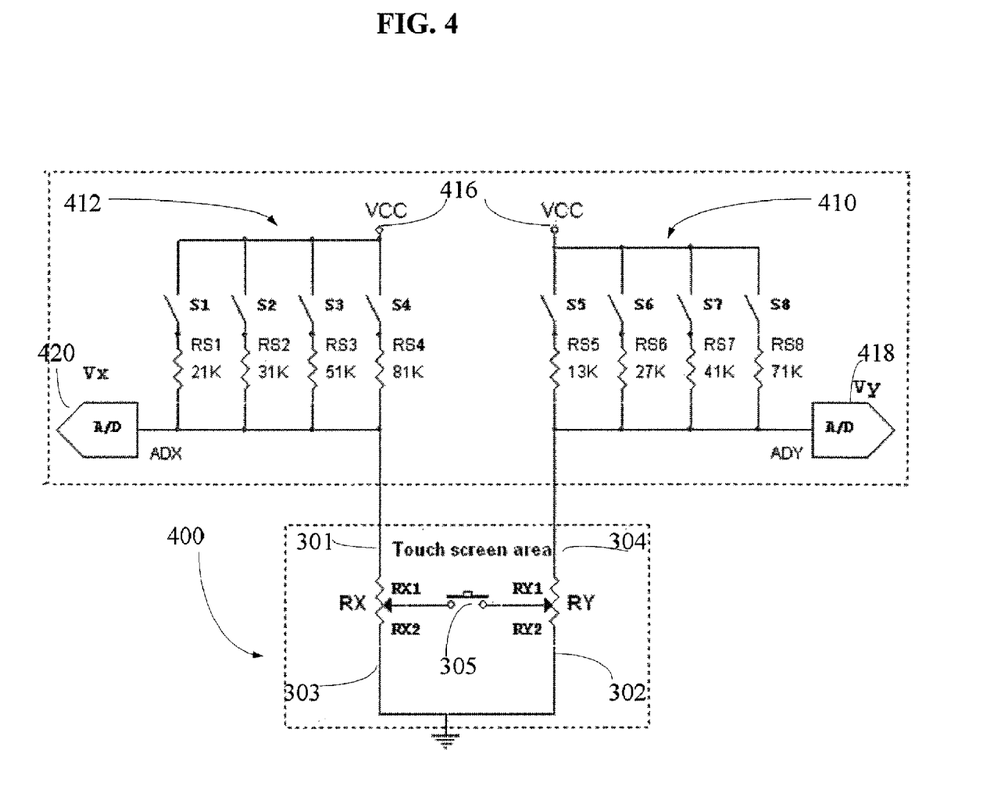
FIG. 4 illustrates a circuit diagram of a secured resistive touch screen, in accordance with a preferred embodiment of the present invention. A variable resistor is connected to each of the free axis terminals which comprises a plurality of parallel resistors of each having a different predetermined resistance, which are, in a predetermined turn, connected in series to a free terminal.

FIG. 4 illustrates a circuit diagram of an eavesdropping-resistant resistive touch screen, in accordance with a preferred embodiment of the present invention. A resistive touch screen 400 is provided with a pair of X-axis terminals 301, 303, across the screen in X-direction and a pair of Y-axis terminals 302, 304, across the screen in Y-direction. One terminal of each pair (302, 303) is connected to ground. Each of the remaining free terminals is connected in series with a variable resistance circuitry. In the embodiment shown in this figure the variable resistance circuitry comprises a plurality of resistors (a first group 412 of resistors RS1, RS2, RS3 and RS4 for the X free terminal and a second group 410 of resistors RS5, RS6, RS7 and RS8 for the Y free terminal) of various resistance connected in parallel and provided with switching that connects only one resistor of predetermined resistance in series with the free terminal. The number of resistors in the two groups need not be equal and may be chosen as desired. Voltage VCC 416 is connected (in turn) to each of the variable resistance circuitries.

Each time the touch screen is pressed two measurements are taken. A first measurement is taken to with one of the free terminals effectively disconnected and the other free terminal connected in series with a resistor of predetermined resistance from the available resistors. A second measurement is then taken, with the other terminal now effectively disconnected and the first terminal connected in series with a resistor of predetermined resistance from the available resistors. The result is passed through A/D converters (418, 420).

The next time the touch screen is pressed the two readings are repeated but with resistors of different resistances. The manner in which the resistors of various resistances are employed is predetermined and known to the interpreter. This way if the touch screen is unlawfully monitored and connected to measuring equipment it would be impossible to obtain the meaningful information on the tapped sequence on the touch screen, as at any given instance tapping on the same position on the screen would yield different resistance readings.

In some embodiments, at least some RS resistors may be connected in series or in mixed series-parallel combinations.

Figure 5:
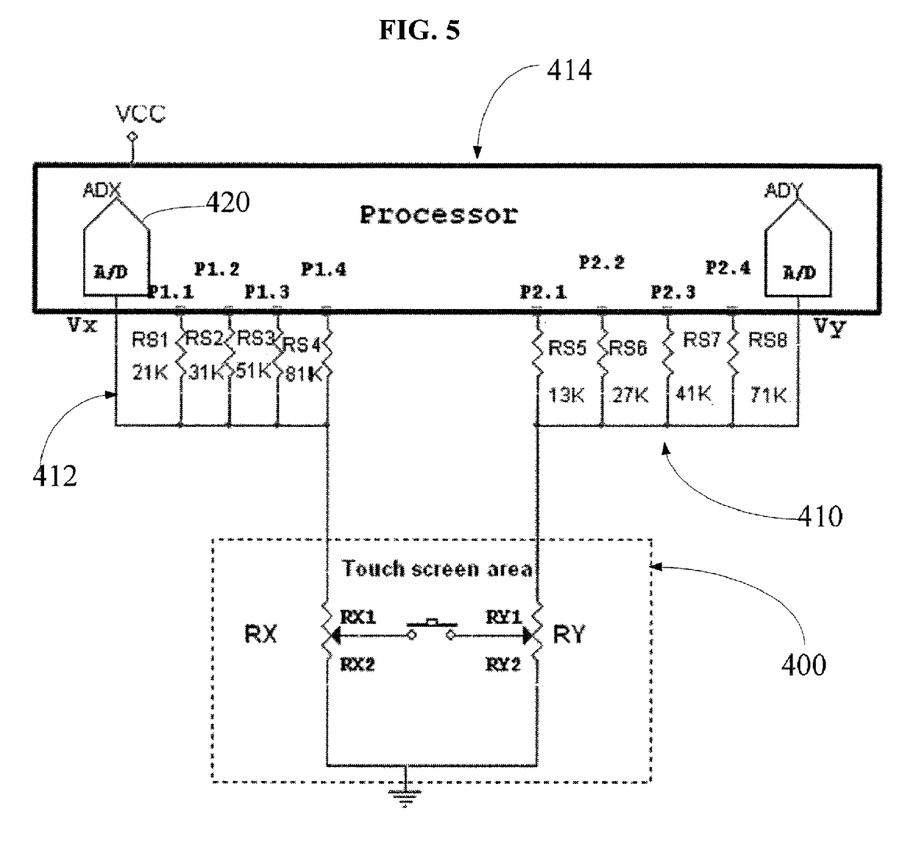
FIG. 5 illustrates a circuit diagram of an eavesdropping-resistant resistive touch screen, in accordance with another preferred embodiment of the present invention similar to the one shown in FIG. 4, where switching between resistors is carried out by a designated processor.

FIG. 5 illustrates a circuit diagram of an eavesdropping-resistant resistive touch screen, in accordance with another preferred embodiment of the present invention similar to the one shown in FIG. 4, where a processor 414 (controller) controls the performance of the system and is used for switching between the resistors and each resistor is shown connected to the processor through a pin P. In the example of FIG. 5 RS1 is connected through pin P1.1, RS2 through pin P1.2, and so on. Each pin P may be defined as a tri-state port, having for example a tri-state logic input/output (I/O) component. A tri-state logic component can be simply made using two transistors, and, depending on the state (ON or OFF) of each transistor, may assume one of three states: infinite impedance (practically), Vcc or 0V (ground in the example of FIG. 5). Note that in the embodiment of FIG. 5, resistors RS do not have associated switches, which are not necessary when each resistor is connected to a tri-state logic component. Two general equations for Vx and Vy indicate the way these voltages are calculated as function of resistors RS, RX and RY (see also Example below).

In operation, by pressing (electrically activating) a pad, an electrical path is established through all active resistors RS and resistances RX and RY associated with the pad. The instant pair of voltages (Vx,Vy) is now associated with the pressed pad (and instant resistor configuration) and is returned to processor 414 through the two A/D converters 418 and 420. Since the instant resistance configuration and associated electrical characteristics are determined by the processor, the returned (Vx,Vy) readings uniquely report the location of the pressed pad. When the resistance configuration is changed to a new "instant" configuration different from the previous one, the new instant (Vx,Vy) readings change as well. In other words, the pair of voltages VX and VY signals returned to the processor is determined with respect to the instant resistance configuration and is meaningful only when this configuration is known by the processor. The variable and configurable resistor network ensures that the signal input to a pad is random or otherwise unknown to a potential unauthorized or unlawful monitoring of the touch screen. The configuration may be varied according to a random generation sequence, a predetermined algorithm, a look-up table, or some other suitable mechanism to substantially decrease the likelihood that an eavesdropper on the signal will gain useful information.

In some embodiments, the resistor and switch network may be implemented in an integrated circuit, for example in silicon. In some embodiments, the resistor network and the processor may be implemented together in an integrated circuit. In some embodiments, the resistor network, A/D converters and the processor may be implemented together in an integrated circuit.

EXAMPLE

As an example, assume that in FIG. 4 VCC is +5V and that the values of the resistors are as follows: RX and RY are divided such that $RX1=83\ k\Omega$, $RX2=17\ k\Omega$, $RY1=38\ k\Omega$ and $RY2=63\ k\Omega$. An equivalent resistance $RXY2eqv=(RX2*RY2)/(RX2+RY2)=13.36\ k\Omega$.

Further assume that $RS1=21\ k\Omega$, $RS2=31\ k\Omega$, $RS3=51\ k\Omega$ and $RS4=81\ k\Omega$ so that $RS1||RS2=(RS1*RS2)/(RS1+RS2)=12.52\ Kk\Omega$, and that $RS5=13\ k\Omega$, $RS6=27\ k\Omega$, $RS7=41\ k\Omega$ and $RS8=71\ k\Omega$ so that $RS5||RS6=(RS5*RS6)/(RS5+RS6)=8.775\ k\Omega$.

Assume now that pad "4" (see FIG. 1) is pressed. The pressing of pad 4 will produce an instant voltage pair (Vx, Vy) which is a function of the instant active resistance configuration, as follows, see Table 1. In the table, "F" means "function of". The table shows that by using only RS1 and RS5 (all other resistors being disconnected or "inactive"), Vx=4.105V and Vy=3.982V or (4.105V, 3.982V).

TABLE 1

| | |
|---|---|
| Vx as Fx(RS1) | Vx = Vcc * (RX1 + RXY2 eqv)/(RS1 + RX1 + RXY2 eqv) |
| Vx as F(RS2) | Vx = Vcc * (RX1 + RXY2eqv)/(RS2 + RX1 + RXY2eqv) |
| Vx as F(RS3) | Vx = Vcc * (RX1 + RXY2eqv)/(RS3 + RX1 + RXY2eqv) |

TABLE 1-continued

| | |
|---|---|
| Vx as F(RS4) | Vx = Vcc * (RX1 + RXY2eqv)/(RS4 + RX1 + RXY2eqv) |
| Vx as F(RS1∥RS2) | Vx = Vcc * (RX1 + RXY2eqv)/[(RS1 * RS2)/(RS1 + RS2) + RX1 + RXY2eqv)] |
| Vy as F(RS5) | Vy = Vcc * (RY1 + RXY2eqv)/(RS5 + RY1 + RXY2eqv) |
| Vy as F(RS6) | Vy = Vcc * (RY1 + RXY2eqv)/(RS6 + RY1 + RXY2eqv) |
| Vy as F(RS7) | Vy = Vcc * (RY1 + RXY2eqv)/(RS7 + RY1 + RXY2eqv) |
| Vy as F(RS8) | Vy = Vcc * (RY1 + RXY2eqv)/(RS8 + RY1 + RXY2eqv) |
| Vy as F(RS5∥RS6) | Vy = Vcc * (RY1 + RXY2eqv)/(RS5 * RS6)/[(RS5 + RS6) + RY1 + RXY2eqv)] |

Similarly, using only RS2 and RS6, we get (3.783V, 3.266V); using only RS3 and RS7, we get (3.270V, 2,768V); using only RS4 and RS8 we get (2.717V, 2.087V); using only RS1∥RS2 and RS5∥RS6 we get (4.425V, 4.264V). Of course more than one resistor from each group may be used. In fact, any combination of more than two resistors can be used. The example above clearly illustrates that using different active resistor combinations provides, at the same pad, different Vx, Vy signals. The number of various permutations possible with the resistor network shown is of course very large.

It will be apparent to those skilled in the art that various modifications and variations can be made in the invention without departing from the spirit and scope of the invention. Thus, it is intended that the invention cover the modifications and variations of this invention, provided they come within the scope of the appended claims and their equivalents.

What is claimed is:

1. A method for preventing unauthorized electronic or electrical eavesdropping during input of an identification (ID) number into a resistive touch screen, the input representing an ID input event, wherein each digit of the ID number is entered into the touch screen by touching a particular screen contact position associated with the digit and wherein each such touching results in a pair of instant X-axis and Y-axis voltages, the method comprising the steps of:
   a) between any two consecutive ID input events and relative to a constant voltage, changing independently the value of each voltage of the pair of instant X-axis and Y-axis voltages associated with a particular digit to provide a new pair of instant X-axis and Y-axis voltages; and
   b) enabling only an authorized entity to correlate the new pair of instant X-axis and Y-axis voltages with the particular digit, thereby preventing eavesdropping by any unauthorized entity.

2. The method of claim 1, wherein the step of changing independently the value of each voltage of the pair of instant X-axis and Y-axis voltages associated with a particular digit includes changing a resistance value which determines a changed voltage value.

3. The method of claim 2, wherein the changing of the resistance value includes reconfiguring a configurable resistor network which connects electrically the touch screen to a constant voltage source.

4. The method of claim 3, wherein the reconfiguring of the resistor network is done in a way known only to the authorized entity.

5. The method of claim 2, wherein the changing of the resistance value includes varying the resistance of a variable resistor network which connects electrically the touch screen to a constant voltage source.

6. The method of claim 5, wherein the reconfiguring of the resistor network is done in a way known only to the authorized entity.

7. The method of claim 4, wherein the reconfiguring of the resistor network includes changing a resistor network configuration using a random generation sequence known only to the authorized entity.

8. The method of claim 4, wherein the reconfiguring of the resistor network includes changing a resistor network configuration using a predetermined algorithm known only to the authorized entity.

9. The method of claim 4, wherein the reconfiguring of the resistor network includes changing a resistor network configuration using a look-up table known only to the authorized entity.

10. The method of claim 6, wherein the reconfiguring of the resistor network includes changing a resistor network configuration using a random generation sequence known only to the authorized entity.

11. The method of claim 6, wherein the reconfiguring of the resistor network includes changing a resistor network configuration using a predetermined algorithm known only to the authorized entity.

12. The method of claim 6, wherein the reconfiguring of the resistor network includes changing a resistor network configuration using a look-up table known only to the authorized entity.

13. A method for preventing unauthorized electronic or electrical eavesdropping during input of an identification (ID) number into a resistive touch screen, the input representing an ID input event, wherein each digit of the ID number is entered into the touch screen by touching a particular screen contact position associated with the digit and wherein each such touching results in a pair of instant X-axis and Y-axis voltages, the method comprising the steps of:
   a) providing a variable and configurable resistor network electrically connecting the touch screen between ground and a given constant voltage source; and
   b) between any two consecutive ID input events and relative to a constant voltage, reconfiguring the resistor network in a way known only to an authorized entity and unknown to a potential eavesdropper, wherein the reconfiguring results in independently changed instant X-axis and Y-axis voltages associated with a particular digit of the ID number, and wherein a new pair of instant X-axis and Y-axis voltages resulting from the change is recognized only by the authorized entity as representing the particular digit.

14. The method of claim 13, wherein the reconfiguring of the resistor network includes reconfiguring the resistor network using a random generation sequence known only to the authorized entity.

15. The method of claim 13, wherein the reconfiguring of the resistor network includes reconfiguring the resistor network using a predetermined algorithm known only to the authorized entity.

16. The method of claim 13, wherein the reconfiguring of the resistor network includes reconfiguring the resistor network using a look-up table known only to the authorized entity.

17. A touch screen device comprising:
a) a resistive touch screen having a plurality of contact positions, each contact position being in electrical communication with a constant voltage source through a variable and configurable resistor network;
b) means for reconfiguring the resistor network after each touching of a particular contact position such as to independently change the value of each voltage of an instant pair of X-axis and Y-axis voltages representing the particular contact position; and
c) means for enabling only an authorized entity to interpret the independently changed instant X-axis and Y-axis voltage values as representing the particular digit.

18. The touch screen device of claim 17, wherein the means for reconfiguring the resistor network include a processor which configures an instant resistor configuration based on a random generation sequence.

19. The touch screen device of claim 17, wherein the means for reconfiguring the resistor network include a processor which configures an instant resistor configuration based on a predetermined algorithm.

20. The touch screen device of claim 17, wherein the means for reconfiguring the resistor network include a processor which configures an instant resistor configuration based on a look-up table.

* * * * *